(12) United States Patent
Redler et al.

(10) Patent No.: US 7,495,567 B2
(45) Date of Patent: Feb. 24, 2009

(54) STRUCTURAL CONFIGURATION FOR AN RFID TAG

(75) Inventors: Timothy R. Redler, Campbell, CA (US); Nikola Cargonja, San Carlos, CA (US); Philip J. Keleshian, San Jose, CA (US); Roderick E. Thorne, Palo Alto, CA (US)

(73) Assignee: Savi Technology, Inc., Mountain View, CA (US)

( * ) Notice: Subject to any disclaimer, the term of this patent is extended or adjusted under 35 U.S.C. 154(b) by 285 days.

(21) Appl. No.: 11/129,993

(22) Filed: May 16, 2005

(65) Prior Publication Data

US 2006/0255947 A1 Nov. 16, 2006

(51) Int. Cl.
*G08B 13/14* (2006.01)

(52) U.S. Cl. .............. 340/572.7; 340/572.1; 340/572.8

(58) Field of Classification Search .... 340/572.1–572.9
See application file for complete search history.

(56) References Cited

U.S. PATENT DOCUMENTS

| 4,774,503 | A | * | 9/1988 | Bussard | 340/572.9 |
| 6,133,836 | A | * | 10/2000 | Smith | 340/572.7 |
| 6,980,111 | B2 | * | 12/2005 | Nolte | 340/572.8 |
| 7,135,974 | B2 | * | 11/2006 | Hernandez et al. | 340/572.1 |

* cited by examiner

*Primary Examiner*—Benjamin C Lee
*Assistant Examiner*—Travis R Hunnings
(74) *Attorney, Agent, or Firm*—Haynes and Boone, LLP (57) ABSTRACT

A tag includes a housing, an antenna disposed within the housing, and circuitry within the housing that is electrically coupled to the antenna. A battery within the housing is electrically coupled to the circuitry, the battery being positioned so as to avoid significant interference with electromagnetic fields associated with the antenna. A tag holder can be detachably coupled to a radio frequency tag, and has structure facilitating attachment of the tag holder to an object other than a tag. A tag includes a circuit and an antenna, the antenna having a plurality of conductive segments and capacitors that are coupled in series to form an endless loop.

26 Claims, 8 Drawing Sheets

US 7,495,567 B2
STRUCTURAL CONFIGURATION FOR AN RFID TAG

FIELD OF THE INVENTION

This invention relates in general to radio frequency identification (RFID) technology and, more particularly, to a configuration for an RFID Tag.

BACKGROUND

One known application for radio frequency identification (RFID) technology is to track a mobile object, such as a shipping container. A device known as a "tag" is provided on the object to be tracked. The tag typically includes circuitry coupled to an antenna, and a battery to power the circuitry. The tag can transmit radio signals, and some tags can also receive radio signals. Existing tags have been generally adequate for their intended purposes, but have not been satisfactory in all respects.

SUMMARY OF THE INVENTION

One of the broader forms of the invention involves an apparatus having a tag that includes: a housing; an antenna disposed within the housing; circuitry disposed within the housing and electrically coupled to the antenna; and a battery disposed within the housing and electrically coupled to the circuitry, the battery being positioned so as to avoid significant interference with electromagnetic fields associated with the antenna.

Another of the broader forms of the invention involves an apparatus having a tag holder that can be detachably coupled to a radio frequency tag, and that has structure facilitating attachment of the tag holder to an object other than a tag.

Still another of the broader forms of the invention involves an apparatus with a tag that includes a circuit and an antenna, the antenna having a plurality of conductive segments and a plurality of capacitors that are coupled in series to form an endless loop.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
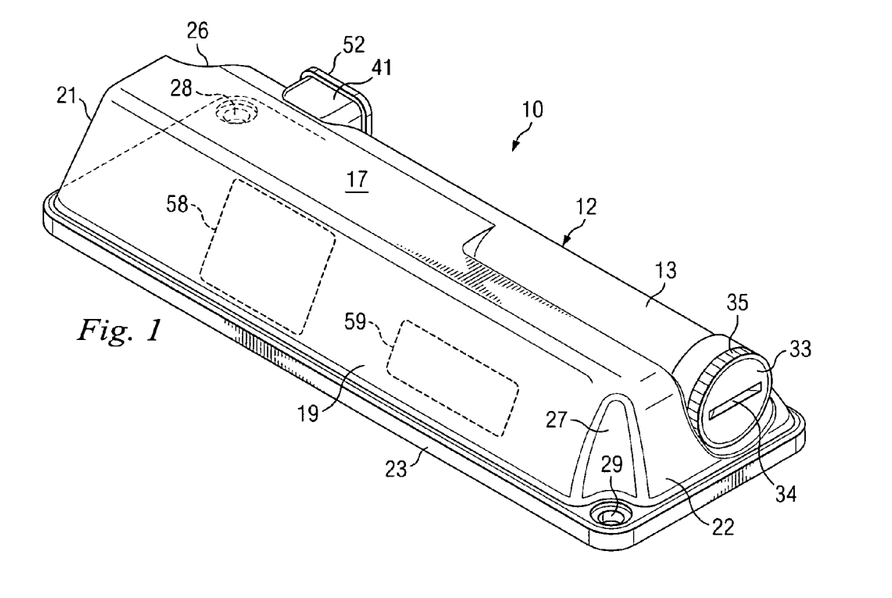
FIG. 1 is a diagrammatic perspective view of an apparatus that is a radio frequency identification (RFID) tag, and that embodies various different aspects of the invention.
Figure 2:
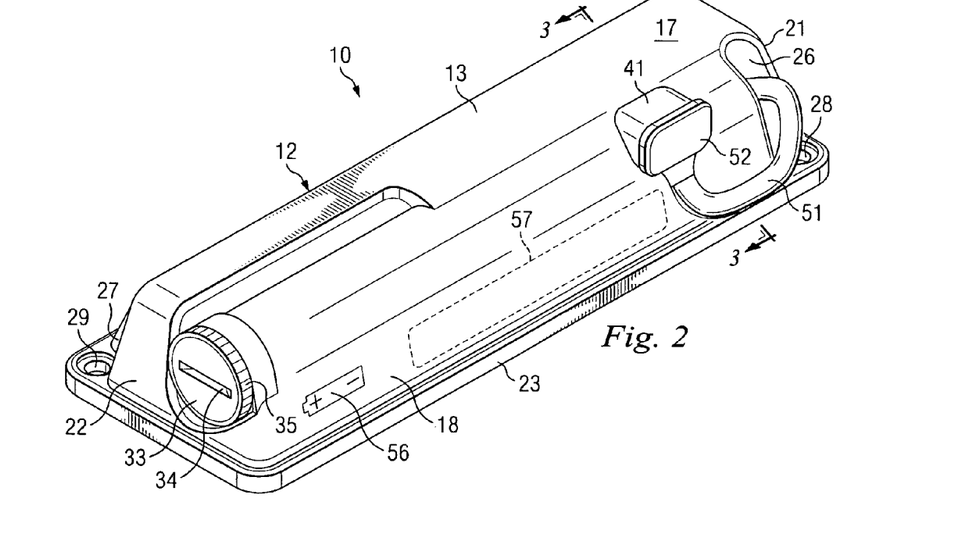
FIG. 2 is a diagrammatic perspective view of the tag, taken from a different direction.
Figure 3:
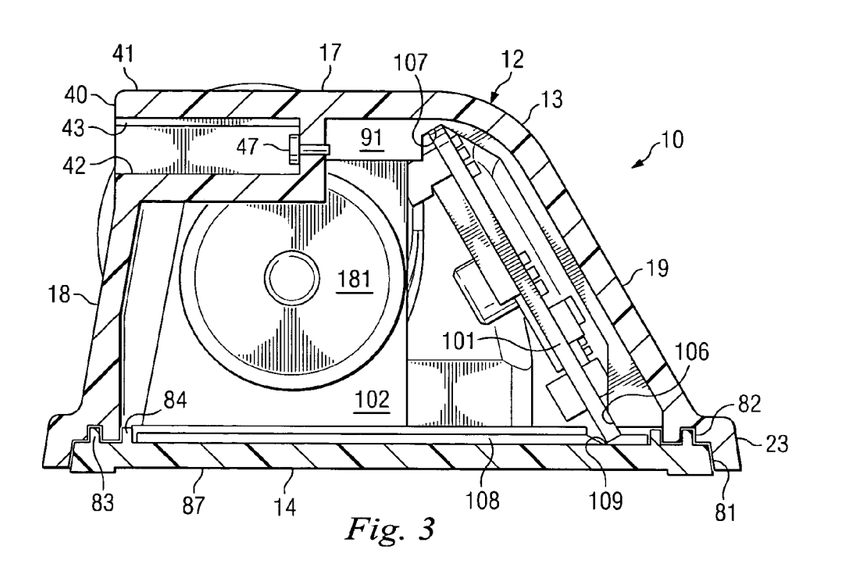
FIG. 3 is a sectional view, taken along the section line 3-3 in FIG. 2.

FIG. 1 is a diagrammatic perspective view of an apparatus that is a radio frequency identification (RFID) tag 10. FIG. 2 is a diagrammatic perspective view of the tag 10, taken from a different direction. FIG. 3 is a sectional view of the tag 10, taken along the section line 3-3 in FIG. 2.

The tag 10 includes an elongate housing 12 having a top part 13 and a bottom part 14 (FIG. 3). The housing parts 13 and 14 are each made from a high-impact plastic material that is rigid and durable. A variety of suitable plastics and other materials are known to persons skilled in the art. During final assembly of the tag, the top and bottom parts 13 and 14 are ultrasonically welded to each other using known techniques, in order to secure the parts 13 and 14 together, and in order to seal the interior of the housing from external environmental factors such as moisture, humidity, dust, and so forth.

As best seen in FIG. 3, the top part 13 of the housing has a top wall 17, and two sidewalls 18 and 19 that extend downwardly from opposite sides of the top wall 17. The sidewalls 18 and 19 extend at an angle to each other. Consequently, the housing 12 is somewhat wedge-shaped, and tapers in width in an upward direction. In the disclosed embodiment, the sidewall 19 is oriented to extend at an angle of approximately 60° with respect to the plate-like bottom part 14.

As best seen in FIGS. 1 and 2, the housing top part 13 has approximately vertical end walls 21 and 22 provided at opposite ends thereof. A flange 23 extends around the entire periphery of the lower end of the top part 13, or in other words along lower edges of the sidewalls 18-19 and the end walls 21-22.

The housing top part 13 has two concave recesses 26 and 27 located in diametrically opposite corners. At each of these corners, the flange 23 has a respective vertical hole 28 or 29 extending therethrough. Not-illustrated screws or bolts can be inserted through the holes 28 and 29 in order to fixedly mount the tag 10 on any of a variety of different types of objects, for example a not-illustrated shipping container of a known type. The concave recesses 26 and 27 provide sufficient space so that a mounting screw or bolt can be easily accessed with a screwdriver or a wrench.

With reference to FIGS. 1 and 2, the housing 12 includes a removable battery cover 33, which is physically separate from the top and bottom parts 13 and 14. In the disclosed embodiment, the battery cover 33 is made from the same material as the top and bottom parts 13 and 14, but it could alternatively be made from any other suitable material. The battery cover 33 threadedly engages an opening that is provided in the end wall 22 of the top part 13, as discussed in more detail later. The battery cover 33 has a slot 34. A not-illustrated coin or screwdriver can be manually inserted into the slot 34, in order to facilitate manual rotation of the battery cover 33 for the purpose of removing and installing it. The peripheral edge of the battery cover 33 is knurled, as shown at 35, so that a person can get a good manual grip on the battery cover 33 for the purpose of removing or installing it.

Figure 4:
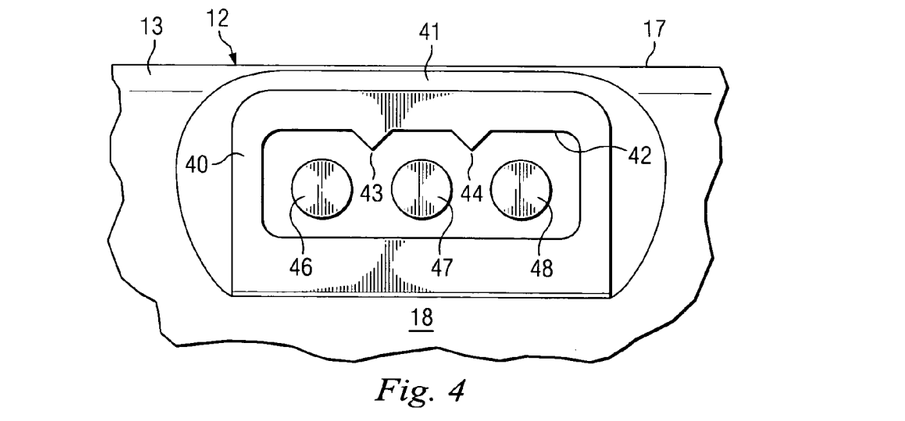
FIG. 4 is a diagrammatic fragmentary side view of a selected portion of the tag.

A projection 41 extends horizontally outwardly from the sidewall 18, at a location near the top of the sidewall 18, and spaced a short distance from the concave recess 26. FIG. 4 is a diagrammatic fragmentary side view of a portion of the tag 10, including the projection 41. As best seen in FIGS. 3 and 4, the projection 41 has an end surface 40 at the outer end thereof. A recess 42 extends horizontally into the projection 41 from the end surface 40. Two parallel orientation ribs 43 and 44 are provided within the recess. Still referring to FIGS. 3 and 4, three spaced metal contacts 46, 47 and 48 are provided at an inner end wall of the recess 42. With reference to FIG. 3, these contacts each have a flat head that is disposed against the inner end wall, and each have a stem of smaller diameter that extends through an opening in the inner end wall. The contacts 46-48 collectively serve as a serial connector disposed within the recess 42.

With reference to FIG. 2, a flexible rubber strip 51 has one end fixedly secured to the top part 13 of the housing, in the region of the concave recess 26. An integral rubber stopper 52 is provided at the other end of the strip 51, and can be removably inserted into the recess 42 with a friction fit, in order to seal the recess 42 against external environmental factors such as moisture, humidity, dust and so forth. For clarity, FIGS. 3 and 4 each show the recess 42 without the stopper 52.

With reference to FIG. 2, a battery orientation indicator 56 is provided on the sidewall 18, near the battery cover 33. The indicator 56 may be molded into the material of the housing, or may be a label that is adhesively secured to the sidewall 18. The indicator 56 shows the proper orientation for a replaceable battery in the tag 10. In FIG. 2, reference numeral 57 diagrammatically designates a region where an adhesive label may optionally be applied to the sidewall 18. Similarly, with reference to FIG. 1, reference numerals 58 and 59 diagrammatically indicate regions where other adhesive labels may optionally be applied to the sidewall 19. The labels 57-59, if present, can carry indicia providing information such as the name and address of the manufacturer of the tag, a name or trademark associated with the tag, instructions regarding use of the tag, a model number and/or serial number of the tag, a barcode, or any other appropriate information.

Figure 5:
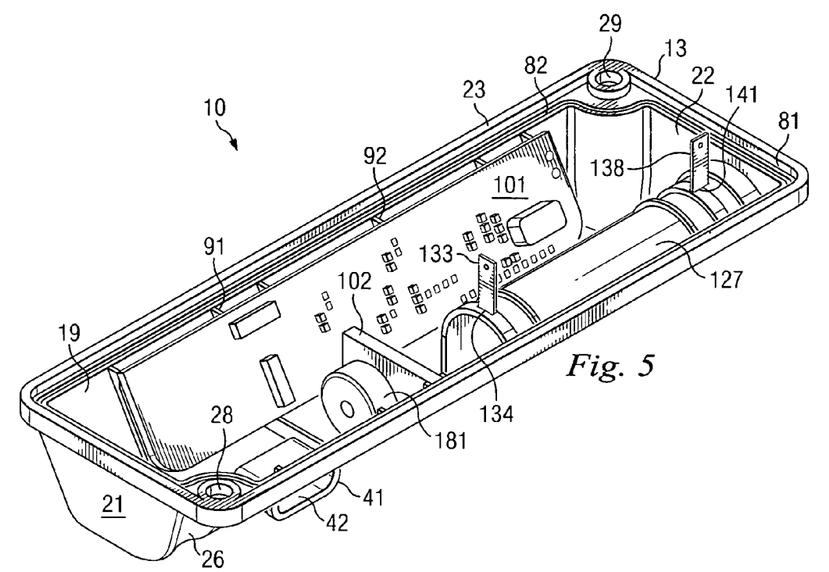
FIG. 5 is a diagrammatic perspective bottom view of the tag, with a housing bottom part removed so that the interior of the tag is visible.
Figure 6:
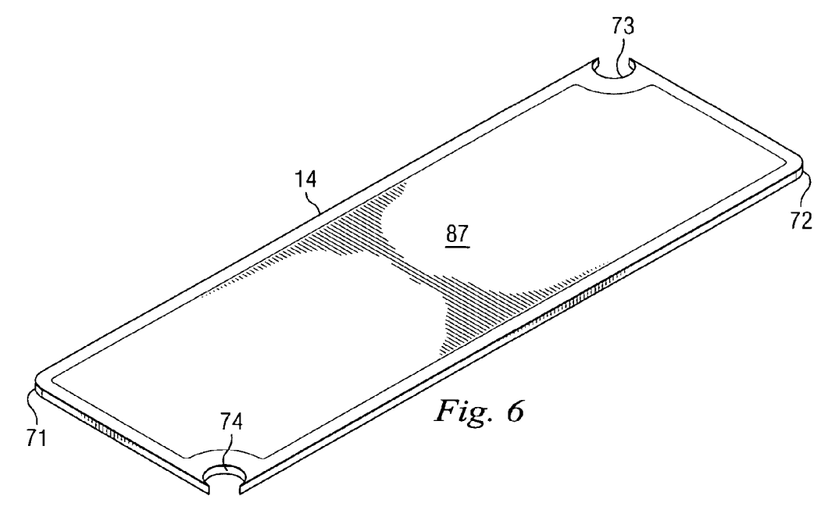
FIG. 6 is a diagrammatic perspective bottom view of the housing bottom part.

FIG. 5 is a diagrammatic perspective bottom view of the tag 10, with the bottom part 14 removed so that the interior of the tag is visible. FIG. 6 is a diagrammatic perspective bottom view of the bottom part 14. As evident from FIG. 6, the bottom part 14 has an approximately rectangular shape, with two opposite corners 71 and 72 that are slightly rounded. The other two corners have circular cut-outs 73 and 74.

With reference to FIGS. 3 and 5, the peripheral flange 23 of the housing top part 13 has a recess 81 extending along the inner side thereof. The peripheral edge of the recess 81 conforms in shape to the peripheral edge of the plate 14. In the assembled configuration of the tag, the recess 81 receives the peripheral edges of the plate 14. A peripheral groove 82 is provided in a surface of the recess 81. As shown in FIG. 3, the bottom part 14 has on its upper side two parallel peripheral ribs 83 and 84 that extend along the entire periphery of the bottom part. The rib 83 is received within the peripheral groove 82, and the peripheral rib 84 is disposed adjacent inner surfaces of the sidewalls 18-19 and the end walls 21-22. As shown in FIGS. 3 and 6, the underside of the bottom part 14 has a planar base surface 87.

With reference to FIGS. 3 and 5, the top part 13 of the housing 12 has a plurality of integral ribs within the interior thereof, two of which are indicated by reference numerals 91 and 92. The rib 91 designates a U-shaped rib, which extends along inner sides of the top wall 17 and each of the sidewalls 18 and 19. The rib 92 is an L-shaped rib, which extends along inner sides of the sidewall 19 and the top wall 17. The ribs provide structural reinforcement for the housing, and also facilitate support within the housing of a main printed circuit board 101 and an auxiliary printed circuit board 102.

For example, with reference to FIG. 3, the U-shaped rib 91 has a recess 107 that receives one side edge of the main circuit board 101, and has a surface 106 that engages the circuit board 101 near an opposite side edge thereof. The bottom part 14 of the housing has several spaced transverse ribs on its upper side, one of which is visible at 108 in FIG. 3. The rib 108 has a recess 109 that receives a side edge of the circuit board 101. It will be noted that the circuit board 101 is adjacent and parallel to the sidewall 19, and thus extends at an angle with respect to the base surface 87 of the bottom part 14. Other ribs cooperate with the auxiliary circuit board 102, in order to hold it in place. Thus, when the housing parts 13 and 14 have been ultrasonically bonded together, the circuit boards 101 and 102 are each retained in the proper position within this housing 12.

As noted above, the circuit board 101 extends at an angle with respect to the base surface 87 of the bottom part 14. More specifically, the circuit board 101 extends at an angle in the range of 50° to 90° with respect to the base surface 87. In the illustrated embodiment, the angle is approximately 60°.

Figure 7:
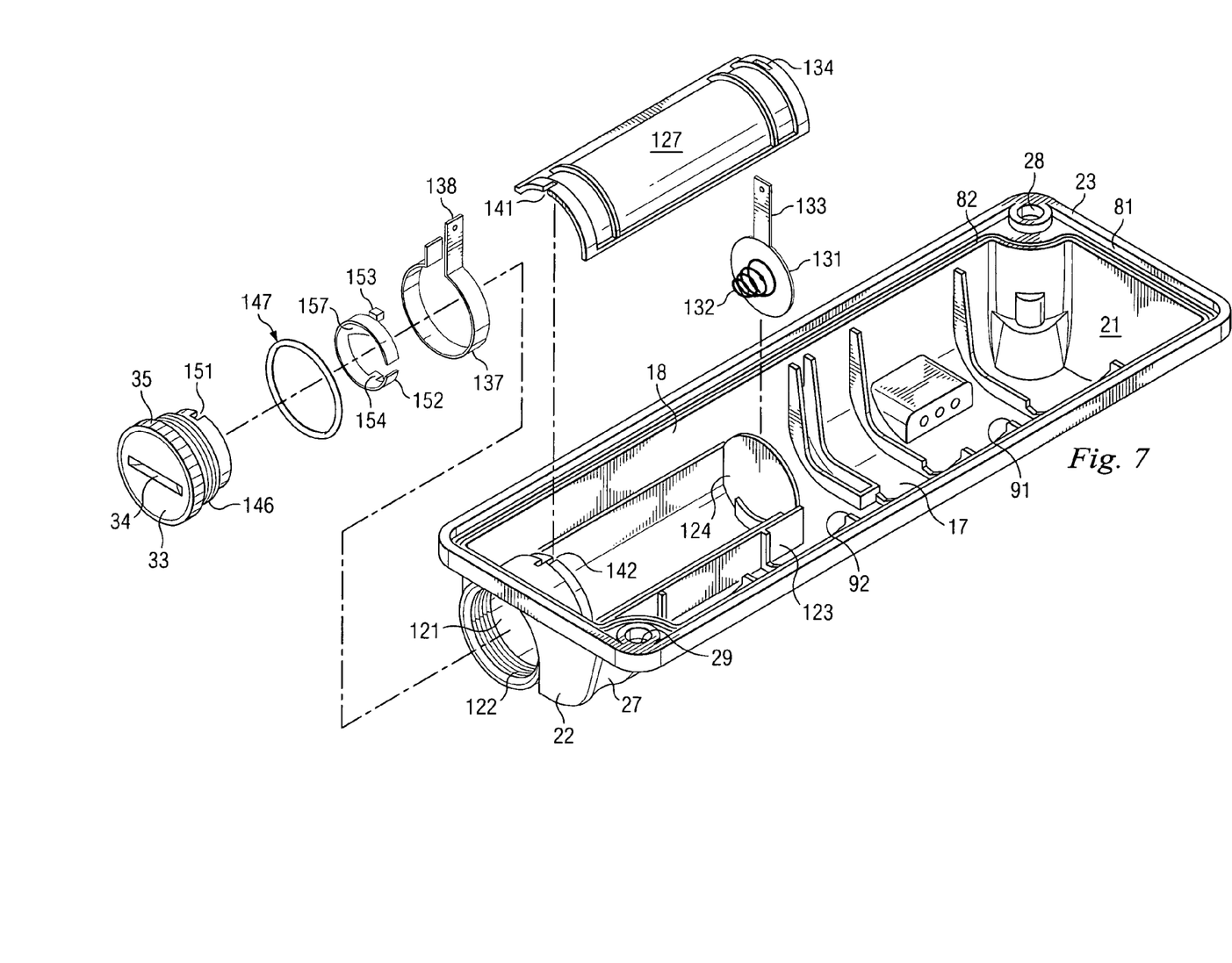
FIG. 7 is a diagrammatic exploded perspective view of a top part of the housing, showing an underside thereof.

FIG. 7 is a diagrammatic exploded perspective view of the top part 13 of the housing 12, showing an underside thereof. With reference to FIGS. 5 and 7, a cylindrical battery access opening 121 extends through the end wall 22 of the top part 13, and has threads 122 at its outer end. The top part 13 has a battery compartment defined by a sidewall 123, an end wall 124, and a cover 127. The sidewall 123 and end wall 124 are integral to the top part 13, and the cover 127 is a separate arcuate part that is fixedly secured to the top part 13, for example by ultrasonic bonding, or by a suitable adhesive of a known type. In the disclosed embodiment, the cover 127 is made of the same material as the top part 13. However, it could alternatively be made of any other suitable material.

A metal plate 131 has a circular lower part that is disposed against the end wall 124, and that supports a conical coil spring 132. The plate 131 has an outwardly projecting tab 133, which extends through a slot 134 provided in the cover 127.

An annular metal strip 137 is fixedly mounted within the opening 121, slightly inwardly from the threads 122. The strip 137 has an upwardly projecting tab 138, which extends through aligned slots 141 and 142 provided in the cover 127 and the top part 13.

The battery cover 33 has threads 146, which are engageable with the threads 122 in the opening 121. A seal ring 147 is provided around the cover 33, in order to seal the opening 121 against entry of environmental factors such as moisture, humidity, dust, and so forth. In the disclosed embodiment, the seal ring 147 is made from a silicon rubber material, but it could alternatively be made from any other suitable material. The inner end of the cover 33 has two axial slots 151 on diametrically opposite sides thereof, only one of which is visible in FIG. 7. A metal contact has a C-shaped strip 152 that is received within a circular recess provided in an inner end surface of the cover 33. Two resilient tabs 153 and 154 project outwardly from opposite sides of the strip 152, and are each received within a respective one of the two slots 151. An integral spring strip 157 has one end secured to the strip 152, and is bent to have a slightly arcuate shape. When a battery is disposed within in the battery compartment, the spring 132 engages one end of the battery. The other end of the battery engages the spring strip 157, and the resilient tabs 153 and 154 slidably engage the annular strip 137. Thus, one end of the battery is electrically coupled to the tab 133, and the other end of the battery is electrically coupled to the tab 138.

Figure 8:
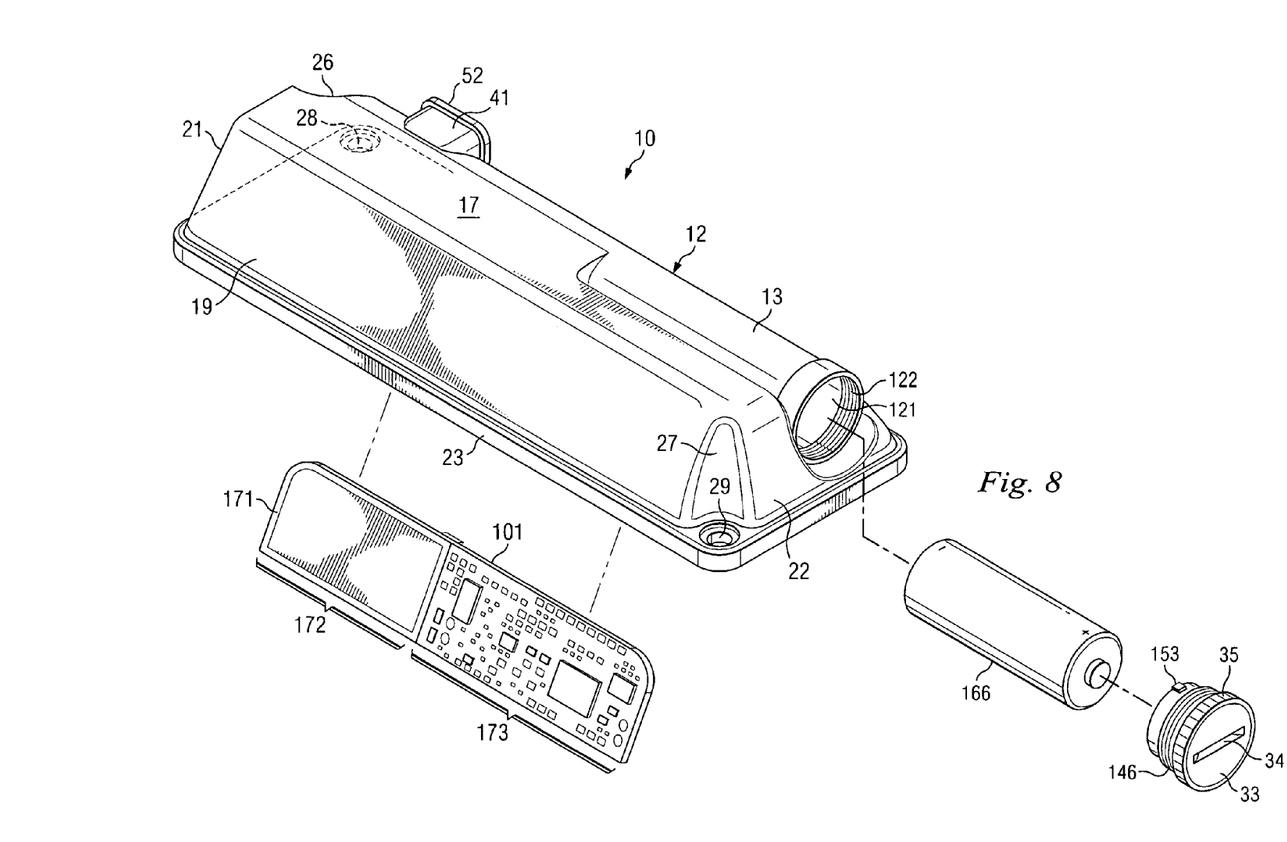
FIG. 8 is a diagrammatic exploded perspective view of the tag, with the bottom part omitted for clarity.

FIG. 8 is a diagrammatic exploded perspective view of the tag 10, with the bottom part 14 omitted for clarity. FIG. 8 shows a battery 166 that is removably disposed within the battery compartment. In the disclosed embodiment, the battery 166 is a lithium cell of a known type, in order to permit the tag 10 to operate as long as possible before the battery 166 eventually becomes discharged. However, the battery 166 could be a known type of battery other than a lithium cell. Further, as new battery technologies are developed, a battery conforming to a new technology could be used at 166, for example if it has a longer operational life then is possible with current battery technology.

FIG. 8 shows a side of the main circuit board 101 that was not visible in prior figures. The electrically conductive runs etched on the printed circuit board 101 include a loop 171 that has an approximately rectangular shape, and that functions as an antenna. The loop antenna 171 is provided on an end portion 172 of the circuit board 101. The structure of the loop antenna 171 is discussed in more detail later. The opposite end portion 173 of the circuit board 101 has an electronic circuit of a type that is known in the art. This circuit uses the loop antenna 171 to send and receive signals in a known manner. The details of the electronic circuitry and the format and content of the radio frequency signals are well known in the art, and are therefore not described here in detail.

As evident from FIG. 8, the loop antenna 171 is provided on the end portion 172 of the circuit board that is remote from the battery compartment containing the battery 166. This is because many battery cells have a metal case. The relative positions of the loop antenna 171 and the battery 166 that are shown in FIG. 8 minimize the extent to which the metal case of the battery 166 can interfere with radio frequency signals being transmitted and/or received using the loop antenna 171.

As mentioned earlier, the circuit board 101 extends at an angle in the range of 50° to 90° with respect to the base surface 87 of the bottom part 14, and this angle is approximately 60° in the illustrated embodiment. The reason for this angle relates in part to the fact that the loop antenna 171 is on the circuit board. In many applications, the tag 10 will be mounted so that the bottom part 14 is adjacent or disposed against a metal surface. The angle of the circuit board 101 is intended to optimize reception and propagation of radio frequency signals by the loop antenna 171, based on a balancing of various competing design considerations. These design considerations include the overall height of the loop, the aspect ratio of the loop, the shielding effect of a metal surface when the tag 10 is mounted adjacent such a surface, and the beam forming that results from reflections of radio frequency waves from such an adjacent metal surface. Orienting the circuit board 101 at an angle also helps keep the housing 12 of the tag more streamlined and compact.

With reference to FIG. 5, the auxiliary circuit board 102 is electrically coupled between the main circuit board 101 and the contacts 46-48 of the serial interface connector located within the recess 42. The auxiliary circuit board 102 carries a serial interface circuit, which handles serial communications through the contacts 46-48 of the serial interface connector. The serial interface circuit includes a relatively large capacitor 181, as well as other components that are not specifically shown in the drawings.

Figure 9:
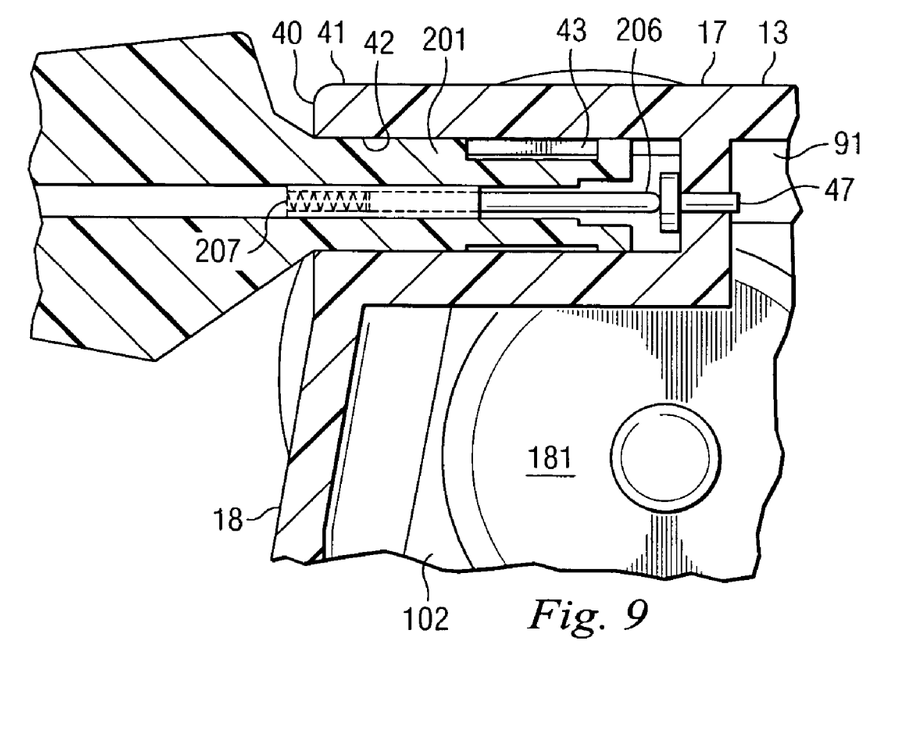
FIG. 9 is a diagrammatic fragmentary sectional view showing a portion of FIG. 3 in an enlarged scale, and also showing an end portion of a serial cable coupled to a serial interface connector of the tag.

FIG. 9 is a diagrammatic fragmentary sectional view showing a portion of FIG. 3 in an enlarged scale, and also showing an end portion 201 of a serial cable that can be coupled to the serial interface connector. The end 201 of the cable has been removably inserted with a friction fit into the recess 42 that contains the serial interface contacts 46-48. The cable end 201 has two grooves that each receive a respective one of the orientation ribs 43 and 44. The cable end 201 also has three axially-movable pins of a known type, one of which is visible at 206. Each of the pins is electrically coupled to a not-illustrated wire within the cable. Each pin is biased axially outwardly by a respective spring, one of which is indicated diagrammatically at 207. The outer end of each of the resiliently-biased pins engages a respective one of the three contacts 46-48 of the serial connector. For example, FIG. 9 shows the outer end of the pin 206 engaging the contact 47.

Figure 10:
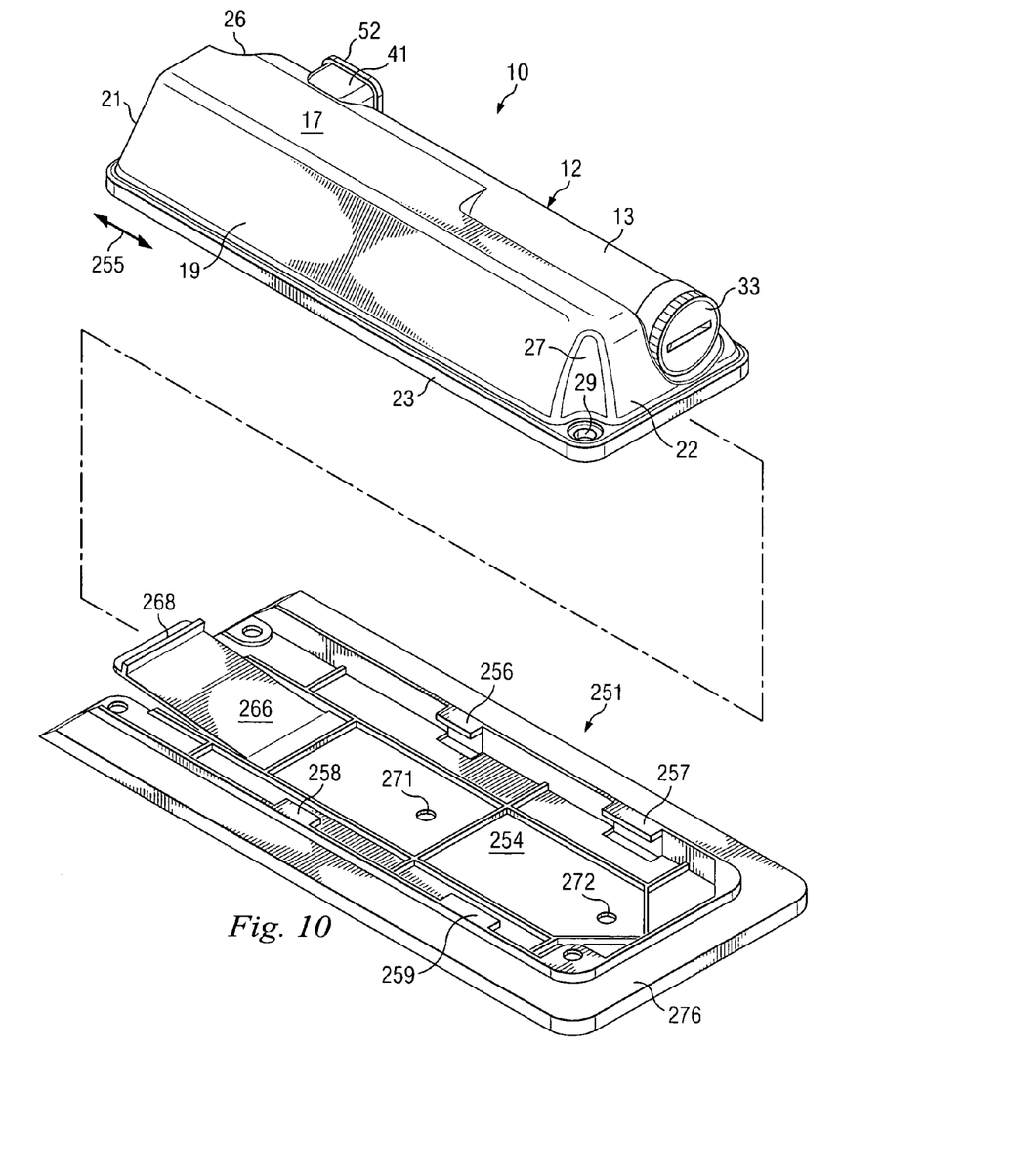
FIG. 10 is a diagrammatic perspective view showing the tag with an optional tag holder.

FIG. 10 is a diagrammatic perspective view that shows the tag 10, and also an optional tag holder 251. As discussed above, the housing 12 of the tag 10 has two openings 28 and 29 that can be used with screws or bolts to mount the tag on an object such as a shipping container. The tag holder 251 represents a different approach for mounting the tag 10 on an object. In particular, the tag holder 251 can be mounted on the object, and then the tag 10 can be easily inserted into and removed from the tag holder 251.

In more detail, the tag holder 251 includes a base part 254, and the tag can be inserted into and removed from the base part 254 in directions parallel to the double-headed arrow 255 in FIG. 10. In the disclosed embodiment, the base part 254 is made from the same material as the housing 12 of the tag 10. However, the base part 254 could alternatively be made from any other suitable material. The base part 254 has holding portions 256-259, which slidably receive the flange 23 on the tag 10 in order to retain the tag 10 on the tag holder 251. The base part 254 has a resilient tongue 266 with a rib 268 at the outer end. The base part 254 has several mounting holes, two of which are indicated by reference numerals 271 and 272. Screws or bolts can be inserted through the holes 271 and 272, in order to securely mount the tag holder 251 to an object such as a shipping container. The tag 10 can then be easily inserted into and removed from the tag holder 251, without any need to remove screws or bolts.

In this regard, as the tag 10 is slid into the tag holder 251, the tongue 266 is pressed downwardly against its inherent resilience by the tag. Then, when the tag 10 reaches a fully inserted position, the inherent resilience of the tongue 266 moves the tongue 266 partway back to its original position, so that the rib 268 moves to a position adjacent the flange 23 on the tag. Engagement of the rib 268 and the flange 23 then prevents the tag 10 from moving out of the tag holder 251. In order to remove the tag 10, the outer end of the tongue 266 is manually pressed downwardly, so as to move the rib 268 out of alignment with the flange 23. The tag 10 can then be slid out of the tag holder 251.

The tag holder 251 also includes a U-shaped magnetic part 276, which is fixedly secured to the base part 254 and extends around three sides thereof. The magnetic part 276 is capable of magnetically holding the tag holder 251 and the tag 10 on a metal surface, such as a wall of a steel shipping container. Thus, where the tag holder 251 is to be mounted to an object that is made of metal, it is not necessary to use bolts or screws to mount the tag holder 251. This avoids the need to drill holes in the object to receive screws or bolts. The magnetic part 276 can optionally be omitted, leaving just the base part 254 to serve as the tag holder.

Figure 11:
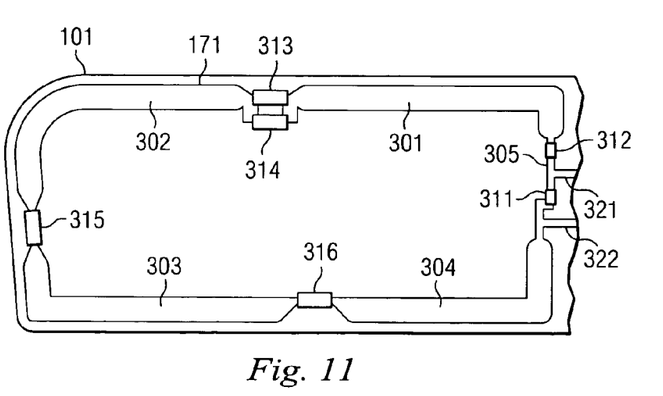
FIG. 11 is a diagrammatic fragmentary view of one half of a main circuit board, showing details of the structure of a loop antenna thereon.

FIG. 11 is a diagrammatic fragmentary view of the half of the main circuit board 101 that carries the loop antenna 171, and shows the structure of the loop antenna 171 in more detail. The loop antenna 171 is approximately rectangular, and has four sides. The loop antenna 171 includes a plurality of conductive segments 301-305 and a plurality of capacitors 311-316 that are electrically coupled so as to form the endless loop. In the disclosed embodiment, the segments 301-305 are conductive runs that were etched from a layer of metal during fabrication of the circuit board. The circuit board also has two conductive runs 321 and 322 that respectively electrically couple the conductive segments 305 and 304 to the circuitry on the circuit board 101. Each of the four sides of the rectangular loop 171 has at least one of the capacitors 311-316 at a location between the ends thereof.

The conductive segments 301-304 are each an approximately L-shaped segment, and each define a respective corner of the approximately rectangular loop 171. The capacitor 311 is coupled between adjacent ends of the conductive segments 304 and 305, the capacitor 312 is coupled between adjacent ends of the conductive segments 305 and 301, the capacitors 313 and 314 are electrically coupled in parallel with each other between adjacent ends of the conductive segments 301 and 302, the capacitor 315 is coupled between adjacent ends of the conductive segments 302 and 303, and the capacitor 316 is coupled between adjacent ends of the conductive segments 303 and 304. In the disclosed embodiment, the capacitor 314 is a variable trim capacitor with a value of about 1 pf, and the capacitors 311, 312, 313, 315 and 316 have respective fixed values of about 18 pf, 4.7 pf, 4.0 pf, 5 pf and 4.7 pf. However, these specific capacitance values are exemplary, and other capacitance values could be used under other circumstances, for example to tune the loop 171 for use at a different frequency.

The loop 171 is a tuned circuit with both capacitive and inductive characteristics. In this regard, the conductive segments 301-305 collectively define an inductor, and the capacitors 311 and 312 together define a capacitance, the value of the capacitor 312 being selected to tune the loop to a selected frequency. In the disclosed embodiment, the selected frequency is 433 MHz. However, it would alternatively be possible to use some other frequency as the selected frequency. If the capacitors 313-316 were omitted, there would be a relatively high impedance in the loop at a point located along the conductive segment 301 near the capacitor 312. This high impedance would cause the tuned frequency to be subject to undesirable variation if an object such as a metal element or a person's hand is moved into proximity with the loop 171. Stated differently, this proximity effect changes the tuned characteristic of the antenna, thereby decreasing the gain of the antenna at the selected frequency. The capacitors 313-316 are therefore provided to counteract this proximity effect, in particular by reducing the effective impedance around the loop. The variable trim capacitor 314 is provided to facilitate tuning of the loop 171 during actual production. FIG. 11 shows one specific configuration for the loop antenna 171, but it will be recognized that a variety of modifications to this configuration are possible while still utilizing unique aspects of the invention that are embodied within the loop antenna 171.

Figure 12:
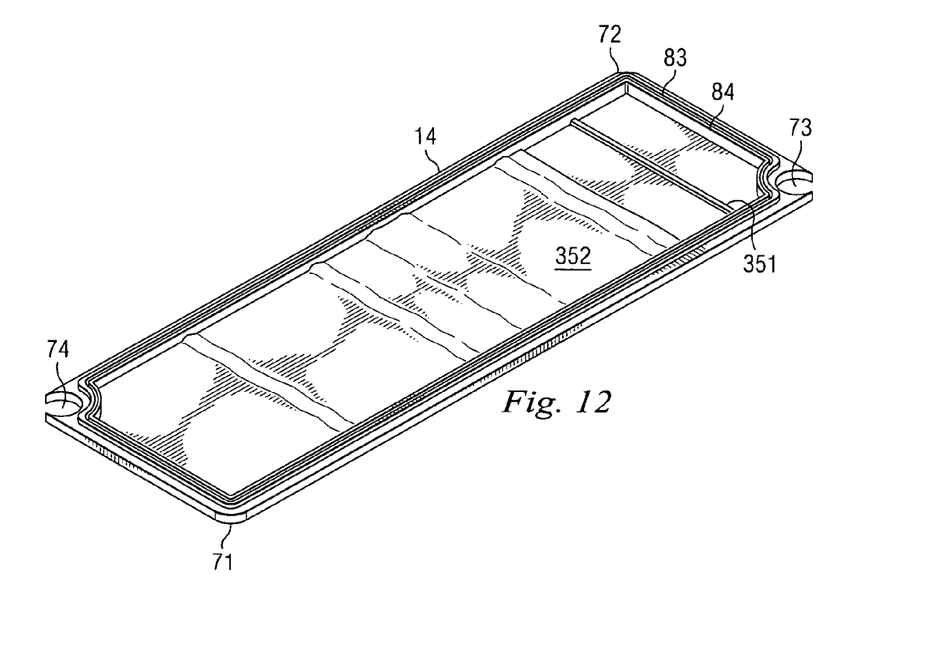
FIG. 12 is a diagrammatic perspective view showing the upper side of the housing bottom part.

FIG. 12 is a diagrammatic perspective view showing the upper side of the bottom part 14. As mentioned earlier, several transverse ribs are provided on the top surface of the bottom part 14, one of which is visible at 351 in FIG. 12. As also discussed earlier, there are many applications in which the tag 10 will be mounted with the bottom part 14 adjacent a metal surface. The presence of such a conductive surface can affect the tuned characteristic of the loop antenna 171. In order to minimize the extent to which such an external conductive surface can affect the operation of the loop antenna 171, a layer of copper foil 352 is provided over about two-thirds of the top surface of the bottom part 14, in particular at the end of the bottom part 14 that is aligned with the loop antenna 171. The copper foil covers several of the transverse ribs, including the rib that is visible at 108 in FIG. 3. The copper foil 352 is not electrically coupled to any other circuitry within the tag 10, and serves as a counter-electrode for the loop antenna 171.

Although one selected embodiment has been illustrated and described in detail, it should be understood that various substitutions and alterations are possible without departing from the spirit and scope of the present invention, as defined by the following claims. Moreover, to the extent that the foregoing description uses directional terms such as top, bottom, side, inner and outer, these terms are used only for convenience in relation to how the disclosed structure is oriented in the drawings, and should not be considered to be limiting as to the scope of protection.

What is claimed is:

1. An apparatus comprising a tag that includes:
   a housing;
   an antenna disposed within said housing;
   circuitry disposed within said housing and electrically coupled to said antenna;
   a battery disposed within said housing and electrically coupled to said circuitry, said battery being positioned so as to avoid significant interference by said battery with electromagnetic fields associated with said antenna; and
   a circuit board disposed within said housing and having said circuitry and said antenna thereon;
   wherein said housing has a base surface on an outer side thereof; and
   wherein said circuit board is oriented at an angle of approximately 60° with respect to said base surface.

2. An apparatus according to claim 1, wherein said housing is made from a nonmetallic material.

3. An apparatus according to claim 2, wherein said housing includes first and second parts that are ultrasonically bonded to each other.

4. An apparatus according to claim 1, wherein said antenna has the form of a loop.

5. An apparatus according to claim 1, wherein said circuit board has said circuitry on a first portion thereof that is adjacent said battery, and has said antenna on a second portion thereof that is spaced from said battery.

6. An apparatus according to claim 1, wherein said housing has spaced first and second sidewalls that form an angle with respect to each other, said first sidewall being oriented at an angle of approximately 60° with respect to said base surface, and said circuit board being located in the region of and extending approximately parallel to said first sidewall.

7. An apparatus according to claim 1, including a serial connector supported on said housing so as to be accessible from externally thereof, said serial connector being electrically coupled to said circuitry within said housing.

8. An apparatus according to claim 7,
   wherein said housing has a recess that extends into said housing from an exterior surface thereof, said serial connector having contacts that are disposed within said recess; and
   including a flexible part located externally of said housing, said flexible part having one end coupled to said housing, and having at the other end a stopper that can sealingly obstruct said recess.

9. An apparatus according to claim 8, wherein said stopper has a portion that is insertable into said recess with a friction fit.

10. An apparatus according to claim 1, wherein said housing includes:

a battery chamber that extends thereinto from an exterior surface thereof, the battery being removably disposed within the chamber; and a cover that is removably and sealingly engageable with an end of the chamber adjacent the exterior surface.

11. An apparatus according to claim 1, including a tag holder that can be detachably coupled to said tag, and that has structure facilitating attachment of said tag holder to an object other than a tag.

12. An apparatus according to claim 11, wherein said tag holder is configured to permit a portion of said tag to be slidably inserted into said tag holder, and has a resilient retaining part that is normally in a first position in which said retaining part resists removal of said tag from said tag holder, and that can be moved against said resilience to a second position that permits removal of said tag.

13. An apparatus according to claim 11, wherein said structure of said tag holder includes a magnetic part.

14. An apparatus according to claim 13, wherein said magnetic part is approximately U-shaped, and extends around a portion of said tag holder that can detachably receive a tag.

15. An apparatus according to claim 11, wherein said structure includes a plurality of openings that are provided through said tag holder, and that are each configured to receive a respective screw.

16. An apparatus according to claim 1, wherein said antenna includes a plurality of conductive segments and a plurality of capacitors, said conductive segments and said capacitors being coupled in series to form an endless loop.

17. An apparatus according to claim 16, wherein said circuit has two terminals that are respectively coupled to opposite ends of one of said capacitors.

18. An apparatus according to claim 16, wherein said loop is approximately rectangular in shape and has four sides, each said side of said loop having a respective one of said capacitors disposed between the ends thereof.

19. An apparatus according to claim 18, wherein a first of said capacitors has opposite ends that are separately electrically coupled to said circuit.

20. An apparatus according to claim 19, wherein one of said sides of said loop has said first capacitor and a second of said capacitors disposed between the ends thereof, said first and second capacitors being adjacent each other.

21. An apparatus according to claim 16, wherein one of said capacitors is a variable capacitor.

22. An apparatus comprising a tag that includes:
a housing;
an antenna disposed within said housing;
circuitry disposed within said housing and electrically coupled to said antenna;
a battery disposed within said housing and electrically coupled to said circuitry, said battery being positioned so as to avoid significant interference by said battery with electromagnetic fields associated with said antenna;
a serial connector supported on said housing so as to be accessible from externally thereof, said serial connector being electrically coupled to said circuitry within said housing;
a first circuit board disposed within said housing and having said circuitry and said antenna thereon; and
a second circuit board disposed within said housing and having thereon a serial interface circuit that is electrically coupled to said circuitry and to said serial interface connector.

23. An apparatus according to claim 22,
wherein said first circuit board has said circuitry on a first portion thereof that is adjacent said battery, and has said antenna on a second portion thereof that is spaced from said battery; and
wherein said second circuit board is disposed closer to said second portion than said first portion of said first circuit board.

24. An apparatus comprising a tag that includes:
a housing;
an antenna disposed within said housing;
circuitry disposed within said housing and electrically coupled to said antenna;
a battery disposed within said housing and electrically coupled to said circuitry, said battery being positioned so as to avoid significant interference by said battery with electromagnetic fields associated with said antenna;
a serial connector supported on said housing so as to be accessible from externally thereof, said serial connector being electrically coupled to said circuitry within said housing, and having a plurality of contacts that are electrically coupled to said circuitry; and
a cable having an end portion that is releasably engageable with said serial connector, said end portion of said cable having a plurality of resiliently biased pins that each engage a respective said contact when said end portion of said cable is releasably engaged with said serial connector, wherein each of said pins is movably supported on said end portion of said cable so that the entirety of the pin is movable relative to the end portion; and including structure physically separate from said pins that effects said resilient biasing of said pins.

25. An apparatus according to claim 24, including a circuit board disposed within said housing and having said circuitry and said antenna thereon.

26. An apparatus according to claim 24, wherein said housing has a recess that extends into said housing from an exterior surface thereof, said contacts of said serial connector being disposed within said recess, and said end portion of said cable being receivable within said recess with a friction fit.

\* \* \* \* \*